(12) United States Patent
Wallace et al.

(10) Patent No.: US 11,074,339 B2
(45) Date of Patent: Jul. 27, 2021

(54) SOFTWARE PROTECTION THROUGH CODE AND CONTROL FLOW DATA HIDING AND OBFUSCATION

(71) Applicant: RAM Laboratories, Inc., San Diego, CA (US)

(72) Inventors: Brooke Wallace, Spring Valley, CA (US); Dean C. Mumme, San Marcos, CA (US); Robert McGraw, Del Mar, CA (US)

(73) Assignee: Ram Laboratories, Inc., San Diego, CA (US)

( * ) Notice: Subject to any disclaimer, the term of this patent is extended or adjusted under 35 U.S.C. 154(b) by 190 days.

(21) Appl. No.: 16/020,726

(22) Filed: Jun. 27, 2018

(65) Prior Publication Data
US 2019/0156025 A1    May 23, 2019

Related U.S. Application Data

(60) Provisional application No. 62/525,329, filed on Jun. 27, 2017.

(51) Int. Cl.
| | |
|---|---|
| *G06F 21/57* | (2013.01) |
| *G06F 21/56* | (2013.01) |
| *G06F 21/54* | (2013.01) |
| *G06F 21/71* | (2013.01) |

(Continued)

(52) U.S. Cl.
CPC .............. *G06F 21/54* (2013.01); *G06F 21/14* (2013.01); *G06F 21/577* (2013.01); *G06F 21/602* (2013.01); *G06F 21/71* (2013.01)

(58) Field of Classification Search
CPC ........ G06F 21/54; G06F 21/14; G06F 21/577; G06F 21/71; G06F 21/566; G06F 2221/033
See application file for complete search history.

(56) References Cited

U.S. PATENT DOCUMENTS

| | | | |
|---|---|---|---|
| 9,954,893 B1 * | 4/2018 | Zhao | .................... H04L 63/1416 |
| 10,360,373 B2 * | 7/2019 | Branco | .................... G06F 21/52 |

(Continued)

*Primary Examiner* — Alexander Lagor
*Assistant Examiner* — Vu V Tran
(74) *Attorney, Agent, or Firm* — Genius Patent APC; Bruce Angus Hare

(57) ABSTRACT

A method of software article protection and transformation includes: retrieving a software article; identifying control flow addressing associated with the software article; removing at least a portion of the control flow addressing; and saving the at least a portion of the control flow addressing from the software article, wherein removing the at least a portion of the control flow addressing comprises replacing call and return functions with protected execution instructions, wherein the protected execution instructions replace call functions by: identifying, in a lookup table, an entry associated with a current instruction; and pushing a return address associated with the current instruction to a secure return stack; and wherein the protected execution instructions replace return functions by: popping the return address from the secure return stack; encrypting the at least a portion of the control flow addressing; and saving the at least a portion of the control flow addressing to a separate software article that is associated with the software article.

18 Claims, 10 Drawing Sheets

(51) Int. Cl.
    *G06F 21/60*    (2013.01)
    *G06F 21/14*    (2013.01)

(56) References Cited

U.S. PATENT DOCUMENTS

| | | | |
|---|---|---|---|
| 2011/0167414 A1* | 7/2011 | Lattner | G06F 21/14 |
| | | | 717/140 |
| 2016/0171211 A1* | 6/2016 | Chen | G06F 21/54 |
| | | | 726/23 |
| 2016/0180065 A1* | 6/2016 | Yi | G06F 21/14 |
| | | | 713/189 |
| 2016/0299765 A1* | 10/2016 | Wesie | G06F 9/45558 |
| 2018/0004946 A1* | 1/2018 | LeMay | G06F 21/554 |

* cited by examiner

SOFTWARE PROTECTION THROUGH CODE AND CONTROL FLOW DATA HIDING AND OBFUSCATION

CROSS-REFERENCE TO RELATED APPLICATIONS

This application claims priority to U.S. Provisional Patent Application Ser. No. 62/525,329, filed on Jun. 27, 2017.

STATEMENT REGARDING FEDERALLY SPONSORED RESEARCH OR DEVELOPMENT

This invention was made with government support under FA8750-15-C-0233 awarded by the Air Force Research Laboratory. The government has certain rights in the invention.

BACKGROUND

Many systems provide various online resources that may be targeted by hackers or other malicious entities. Exposed client software may be a target for reverse engineering, tampering (e.g., to steal intellectual property), modification, illicit use, malware injection, exfiltration to non-authorized systems, and/or other unauthorized use. Furthermore, return oriented programming (ROP), whereby an attacker initiates a buffer overflow injection with shell code or ROP gadgets in an attempt to hijack an application's control flow may be another method used to target exposed software. Such an attack is typically employed to gain escalated privileges and further compromise a computing system.

Existing solutions such as obfuscation, guards, self-checking software, and anti-tamper systems integrated into software fail to meet consumer needs. Most such systems are complex, depend on an outside system or interaction, and/or incur a large impact on processing performance.

Most obfuscation and other software protection systems instrument source code and require access to the source code of the original software article. This approach is not always practical, as when the source code is unavailable.

Therefore there exists a need for a simple way of altering software parts such that source code is not a required input, the resulting performance impact is minimal compared to the original operating performance (e.g., less than ten percent), an element of obfuscation is introduced that is exponentially complex such that a moderately sized software part cannot be reconstructed programmatically, thus removing the value proposition to reverse engineering, and protection against software hijacking attacks using buffer overflow and ROP techniques is provided.

SUMMARY

Some embodiments provide ways of protecting software that runs on systems or devices at risk for tampering or exfiltration. Some embodiments may transform software articles into protected software articles. Some embodiments may transform non-executable content.

Such transformation may include removal of control flow instructions and/or addressing. In addition, some embodiments may remove various other types of instructions. The removed elements may be stored in a separate, associated file that resides in a protected execution environment. Such elements may be accessed via various protected execution instructions.

The protected execution environment may include instructions and/or data that are not available to external systems or resources. In some embodiments, the protected execution environment may include a lookup process, a table that stores instruction pointers, and a secure return stack that stores return address associated with protected execution instructions.

Some embodiments may obfuscate software articles by dividing the software into sections and reordering the sections. The sections may be restored to the original order using protected execution instructions that implement appropriate branch invocations.

In some embodiments, sections of fake code may be inserted into a protected software article. Such fake code may be inserted between the reordered sections.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

Figure 1:
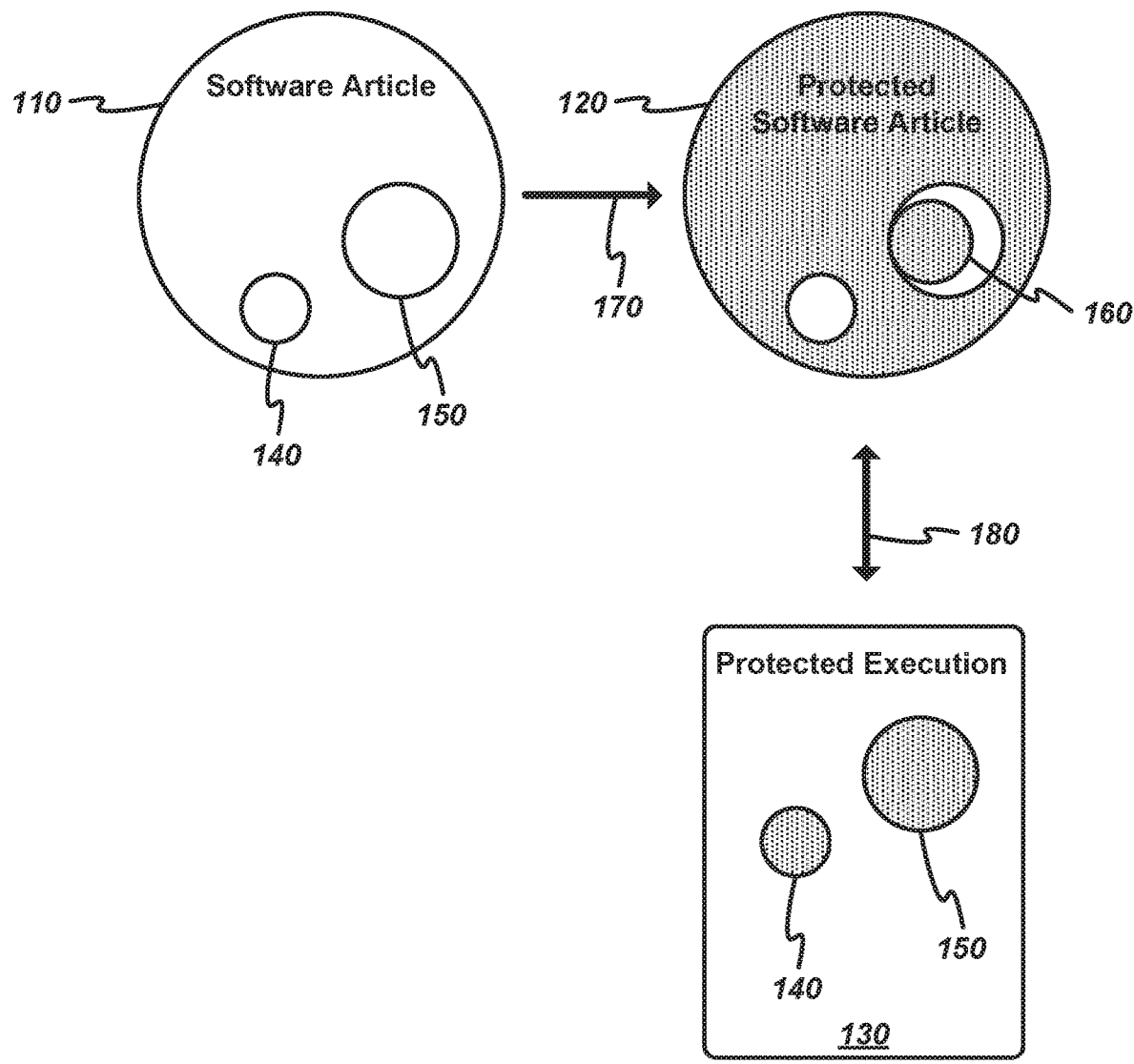
FIG. 1 illustrates a schematic block diagram of a software article before and after transformation to a protected execution (PE) state according to an exemplary embodiment.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide protection of exposed software from tampering or reverse engineering.

Protected execution (PE), as used herein, refers to any type of instruction execution that is outside the scope of normal processing. Protected execution includes both protected out-of-band memory and the execution of instructions. Features such as privilege level, page table manipulation for example hidden out-of-band sections of memory and CR3 register switches on Intel hardware are forms of implementation of protected execution. Protected execution may also be implemented by means of hardware blocks and memory or in software by means such as a separate, off system process or a combination thereof.

A method of software article protection and transformation includes removing control flow addressing and an optional set of instructions to a separate or accompanying article. A software article may be one of a program binary, library, executable component as well as non-executable such as text, image, audio, or other article where the same method may be applied using some indicator other than control flow instructions.

A method of protecting software article(s) transformed as above by a PE instruction or set of instructions that switch to out-of-band protected execution to execute control flow branches, instructions, or access control flow addressing.

An implementation of the PE instruction switching method described above using system calls and protected execution as an OS module.

An implementation of any of the above using oblique predicates for obfuscation through code stirring and code hiding.

An implementation of any of the above using function call/ret substitution with PE instructions, especially system calls and "sysret" to protect call and return addresses, prevent buffer overflow hijacking, and ROP gadgets.

Relocation of return addresses to a protected return stack located in kernel or protected execution space using PE instructions as specified above especially system calls and sysret.

The execution of relocation of select instructions, protected data, code, or algorithms in kernel or protected execution space using PE instructions as described above. Especially system calls and sysret.

The employment of public key encryption as a method of implanting a PU specific in-hardware decryption key used to decrypt protected the secure data above that has been encrypted with a published public key.

An algorithm to access control flow branching from a lookup table and protected return stack using invocation checkers.

The above may be combined with or extensions of SIM and GSIM protection.

One popular form of obfuscation is the explosion of control flow branching by adding decoy paths of execution. The key to this type of obfuscation is the creation of an oblique predicate. That is to define a branch predicate in such a manner such that the branch destination is non-deterministic through static analysis. We present a method of defining just such an oblique predicate with protected execution and move the branch destination address to out-of-band protected memory that is out-of-band to an operating system and unprotected execution. With the addition of code hiding, the complexity of reverse engineering the protected software article is exponentially increased with the number of control flow entries with little performance impact.

Return oriented programming prevention techniques are prevalent in securing systems such as stack guards, periodic stack checking, and address space layout randomization (ASLR). These solutions incur a larger performance impact or have been shown to provide little protection.

Such protection can only be guaranteed through hardware protected execution such as that provided by SIM or GSIM [TBD]. However, lesser levels of security can be provided through alternative variations of protected execution using the invention disclosed herein.

The present invention provides additional security for both cloud computing infrastructure where computational resources are shared and result in an additional lateral attack vector, as well as, embedded systems with or without an operating system that require anti-tamper, anti-exfiltration protection to protect high value software assets such as those found in weapon systems, such as missile control systems, and intellectual property that creates a competitive edge in systems such as autonomous vehicle and drone vision processing and planning algorithms.

A software article anti-tamper, anti-theft, and anti-hijacking method is disclosed that may use protected execution to secure control flow addressing and select instructions from reverse engineering through exfiltration and code analysis attacks—removing the value proposition by creating an intractable problem.

Although many examples above and below may refer to "instructions", one of ordinary skill in the art will recognize that such "instructions" may include executable instructions and/or data associated with execution of the software article (e.g., addresses, flags, variable definitions, etc.). In addition, such "instructions" may refer to data associated with non-executable content.

A first exemplary embodiment provides a method of software article protection and transformation, the method comprising: retrieving a software article; identifying control flow addressing associated with the software article; removing at least a portion of the control flow addressing from the software article; and saving the at least a portion of the control flow addressing to a separate software article that is associated with the software article.

A second exemplary embodiment provides a protected software article generated by: retrieving a software article; removing at least one control flow instruction from the software article and adding remaining instructions to the protected software article; adding the at least one control flow instruction to a protected execution file; and storing the protected software article and the protected execution file.

A third exemplary embodiment provides a method of managing control flow instructions to provide protected execution of a software article, the method comprising: receiving a protected execution (PE) instruction; fetching a base address associated with the software article; fetching a program counter instruction address; and looking up a table entry based on the base address and an offset.

FIG. 1 illustrates a schematic block diagram of a software article before and after transformation to a protected execution state according to an exemplary embodiment. Control flow data and instructions may be removed, optionally encrypted for transport, and placed in a secure package for protected execution.

A software article 110 may be transformed to a protected software article 120 and a set of control flow data 150 and instructions 140 to be protected. The resulting article 120 may replace various instructions (e.g., jmp, call, ret, etc.) with one or more PE instructions 160 that branch software execution to secure out-of-band protected execution 130.

Such a PE instruction may return an address $a_n$ determined as a function of a base address b to a secure data stored in out-of-band protected memory such as a lookup table or other data structure associated with the software article, an offset n into the secure data for the particular instruction, the source instruction address ip of the next instruction following the invoking PE instruction (e.g., an ip register value), and an optional hardware unit specific decryption key, $k_{cpu}$ embedded in hardware and readable only by the hardware decryption logic. The address may be determined by equation (1) below:

$$a_n = f(b,n,ip,k_{cpu}) \quad (1)$$

Where $a_n$ is the destination address generated by code stirring, b is the base address, ip is the ip address placed on the stack by the "syscall" instruction, n is the first argument to syscall and provides an offset-fix to locate the correct address in the table, and $k_{cpu}$ is a hardware-specific encryption key used to decrypt an address from the jump table. Note that $k_{cpu}$ may be an optional component and, while less secure, equation (1) may be applied without using $k_{cpu}$. $k_{cpu}$ may be a two hundred fifty six or five hundred twelve byte encryption key (and/or other appropriately sized key). The offset to an address in the table may be calculated using equation (2) below:

$$\text{offset} = b + (ip+n)\% \text{ table\_size} \quad (2)$$

Note that n may computed at obfuscation time and included in the new binary. No other data (except ip) resides in the obfuscated user space application. Address locations in the table may also be stirred and mixed with invalid data.

The jump table may be computed separately and loaded into protected memory as a data blob at system boot time for each program or library that has been processed by some embodiments.

b may be computed at runtime after determining where the jump table will be located in memory and may be stored in existing kernel data structures, such as the process table entry associated with the process, or disguised as an open file handle associated with the process. The jump table may also be loaded by the kernel at boot time, or on demand as a kernel module. The program may then be instrumented with an additional system call to load the kernel module, or the program may be loaded on the first access to a special system call of some embodiments.

$k_{cpu}$ is considered to be a machine specific encryption key implemented in CPU hardware such that it may only be accessed by the decryption process executed by the hypervisor or kernel at privilege level zero. The key does not need to otherwise be readable. The appropriate encryption key is however communicated to the conversion tool of some embodiments when a program is obfuscated so that the table may be generated. For example, when using a PGP key pair, only the public key needs to be provided.

Such encryption protects the table from being compromised by an attacker even when the OS or protected memory has been subverted, thus giving them access to all the jump addresses and an ability to unwind the application. An attacker may only obtain one address at a time, or observe one jump at a time and those jumps would occur in protected execution space. $k_{cpu}$ may be provided in hardware and be unique to each chip manufacturer such that the key cannot be reverse engineered or derived through a computational process or probing. $k_{cpu}$ may be stored in protected memory.

Additionally, the code stirring approach may blur function boundaries. Call references can no longer be matched with the associated return. A function entry is matched with a return associated with a different function. Insertion of "fake code" further distorts the function boundaries.

Exfiltration of the resulting protected software article 120 results in incomplete code. By additionally removing a small number of code instructions to protected execution, the software article is made more incomplete and non-deterministic. On-system analysis using a just in time (JIT) compiler or debugger to intercept and record each instruction as the instruction is executed may aid in unwinding the stirred code, but cannot fill in the missing instructions.

The software article 110 may be transformed through a process 170 to produce a protected article 120 that has been stripped of control flow addressing 150 and, optionally, a set of instructions 140. By removing both control flow addressing 150 and a set of instructions 140, the resulting protected software article 120 is no longer complete, and requires the accompanying data 150 and instructions 140, and an execution path 180 to protected execution 130 where the data 150 and instructions 140 may be processed but are protected from cyber-attacks.

The control flow addressing 150 provides a location in the software article 110 for instruction removal, a frequency for instruction removal, and removal of the control flow addressing data itself. This, combined with the removal of a set of instructions 140 which can be extremely small at those locations produces an intractable problem with exponential complexity for reconstructing the original software article 110 without the data in 150 and instructions 140.

Figure 2:
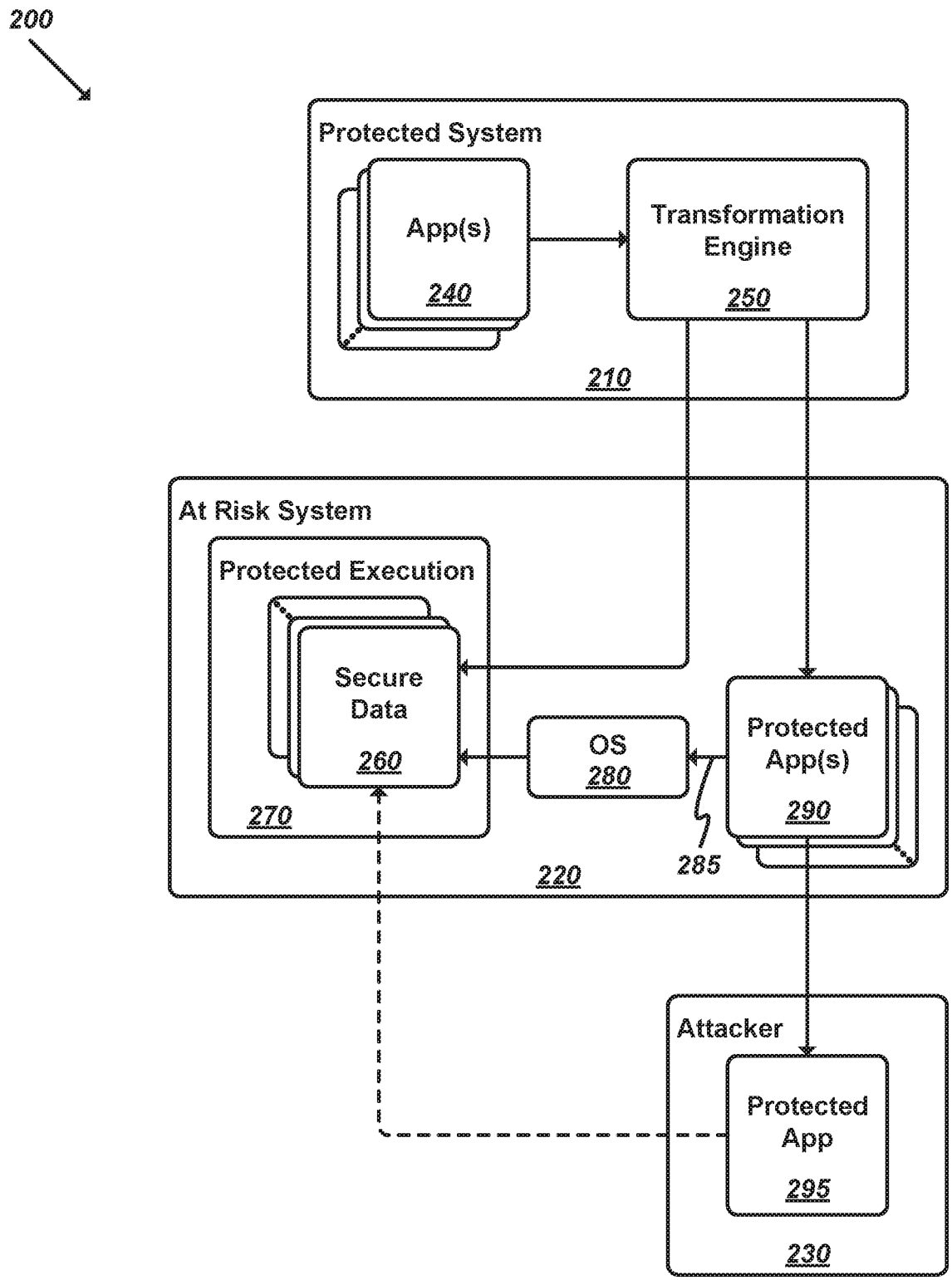
FIG. 2 illustrates a schematic block diagram of a system of some embodiments that includes protected and unprotected components.

FIG. 2 illustrates a schematic block diagram of a development and operations system 200 of some embodiments that includes protected and unprotected components.

As shown, one or more software articles 240 may be transformed using program 250 on a secure system 210. The transformation program 250 may convert the software article 240 into two elements: a protected version 290 of the original application 240, and associated secure data and instructions 260 which may be optionally encrypted to provide security in transit. These may then be installed to a system in operation 220 that is at risk for cyber-attack by an attacker device 230.

When a protected software article 290 is executed, the article may invoke one or more PE instructions 285, for example a system call into an operating system 280, or other software that switches execution to secure out-of-band protected execution 270. The secure data and instructions 260 may then be executed out-of-band to normal system operations. A would-be attacker 230 that has previously compromised the system 220 will only be able to perform exfiltration of the protected software article 290 resulting in a non-executing copy 295 that is missing control flow data and instructions 260 (where such lack of access is indicated by a dashed line). A reverse engineering attempt from an attacker 230 must then guess the missing data and instructions. Furthermore, the attacker does not have an attack vector to the protected data and instructions 260 as the protected data is out-of-band to normal execution 270, even in the case the operating system (or other software) 280 is compromised.

Figure 3:
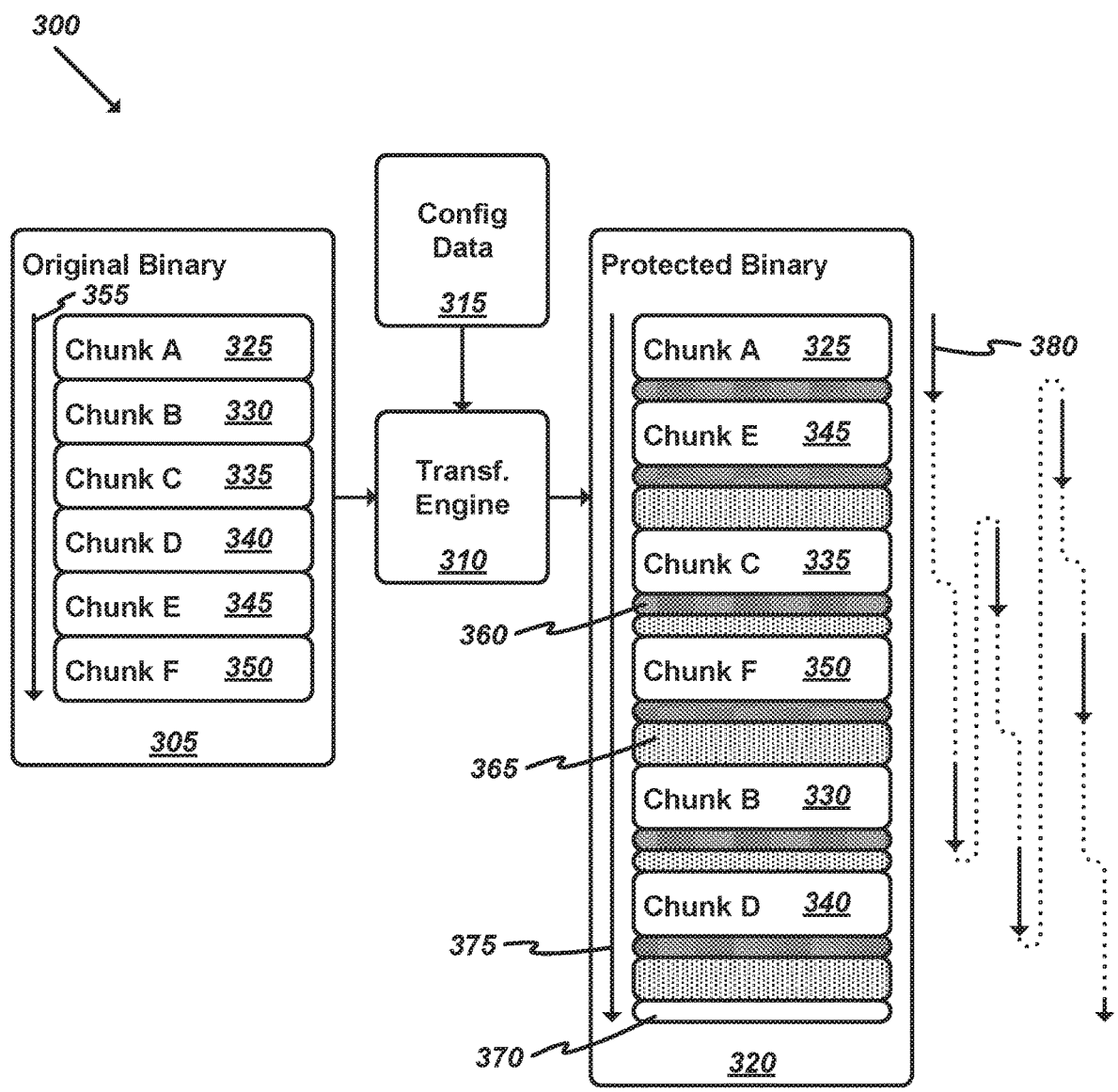
FIG. 3 illustrates a data structure diagram showing obfuscation via PE instructions as performed by some embodiments.

FIG. 3 illustrates a data structure diagram 300 showing obfuscation via PE instructions as performed by some embodiments. In this example, PE instructions are used as the oblique predicate that hides control flow data used to unwind code stirring inter-mingled with decoy instructions.

Some embodiments may introduce a large number of "dummy" execution branches. Such dummy branches may obscure the correct execution path(s) and allow non-deterministic threads to alter the execution path on the fly in order to enable or disable the intended functionality of the application. Enablement may only occur if the application was launched in an authorized context. Furthermore, while the application is running, the application may disable and re-enable the proper control and data paths on the fly. This greatly complicates the attack surface for reverse engineering attacks including those using a debugger. Ways of greatly inflating the control flow graph may include injection of "if" statements and/or decoy statements, massive switching statements, "if-goto" statements and/or "switch-goto" statements (i.e., spaghetti code).

Obfuscation operations may also include decoy data declarations, decoy executable instructions, and control flow decoys. The primary approach behind all these is the use of run-time modifiable function pointers, data pointers, and conditional go to statements that are conditioned on modifiable Boolean variables. Pointers and variables may be obfuscated by: exclusive or ("XOR")-ing the pointers and variables with pseudo-random bits, and/or rendering the pointers and variables as sums of numbers. These are all high-speed operations, so injecting the operations into the original source code will not impose a significant performance penalty for the resulting executable.

Different embodiments may include different types of obfuscation operations (e.g., low-speed, moderate speed, high-speed, and/or very high speed). Security may be more robust for low-speed operations than very high speed operations but such high-level low-speed obfuscations may affect performance and these may be used more sparingly than moderate or high speed operations. Low-speed operations may include high-level obfuscations that dynamically change overall program flow configuration with more robust security than other operation types. Moderate speed operations may include mid-level and low-level obfuscations (i.e., high rate obfuscations) that may be moderately robust to reverse engineering. High speed and very high speed operations may include control flow and data obfuscation (e.g., function-pointer "hopping"). The high speed and very high speed operations may allow massive inflation of control flow structure while preserving application functionality and may be used with high frequency throughout the source code.

An initial level of complexity may be achieved with a software obfuscation technique such as code stirring and inter-mingling executable code with decoy instructions. This method may divide the software article 305 into a fixed number of executable chunks 325-350 which may then be reordered and inter-mixed with decoy instructions 365.

An input configuration 315 may be provided to a transformation engine 310 that transforms the software article 205 to a protected version 320. The resulting disordered or shuffled chunks 325-350 may be linked together with branch invocations implemented by PE instruction(s) 360 that switch to protected execution (such as a system call) to jump to the next chunk in the proper processing order.

The original control path 355 may thus be preserved through oblique predicates in the form of PE instructions 360. The resulting software article 320 no longer follows the expected control path 375, but rather a new control path 380. The PE instructions 360 provide security against static analysis where access to the hidden control flow data 260 and 150 is protected.

In addition to control flow addressing, a small set of instructions 370 may be selected and optionally moved to protected execution to increase the complexity factor for reverse engineering attacks that attempt to reconstruct the program. In this manner, while a sophisticated reverse engineering attack might be able to reconstruct the software article control flow by monitoring execution with tools such as a JIT compiler or debugger—there remains a variable number of instructions at unknown points in the execution path that are unknown. Additional on-system analysis is then required to access and monitor the system registers during execution. Thus, exhaustive testing and assumptions to reconstruct or approximate the original software article are required to further reverse engineer the original software article 305.

Figure 4:
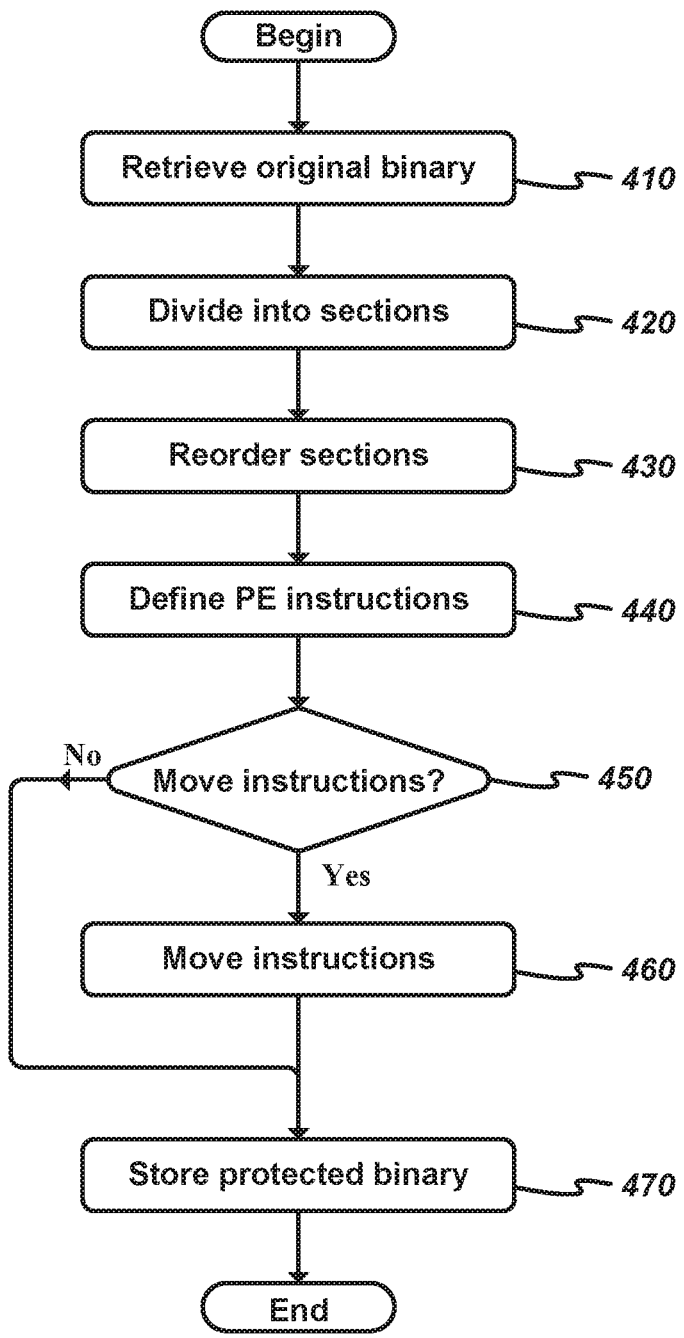
FIG. 4 illustrates a flow chart of an exemplary process that performs control flow obfuscation and moves instructions to protected memory.

FIG. 4 illustrates a flow chart of an exemplary process 400 that performs control flow obfuscation and moves instructions to protected memory. Such a process may begin, for instance, when a software article is converted to a protected article using an application and/or system of some embodiments.

As shown, the process may retrieve (at 410) the original (or unprotected) binary file (or source file, as appropriate) to be transformed. Next, the process may divide (at 420) the original file into sections or chunks of executable code. Some embodiments may define a fixed number of chunks and divide the code based on the fixed number.

The process may then reorder (at 430) the sections. Such reordering may be implemented using various randomization techniques. Next, the process may define (at 440) PE instructions that link together the sections using branch invocations implemented by the PE instruction(s) that switch to protected execution (such as a system call) to jump to the next section in the proper processing order.

In some embodiments, the shuffling may be applied to non-executable content (e.g., text, images, audio, etc.). In such cases, rather than control flow, the sections may be defined using a grid, table, or other appropriate structure, where the original order is maintained in a PE setting. Thus, for instance, a picture may be divided into a number of rectangles that may be numbered from left to right and top to bottom. Unauthorized access to the picture may then result in the rectangles being out of order and the picture being unrecognizable. Section sizes may be defined based on various characteristics of the content (e.g., dimensions or length, resolution, etc.) such that scrambled content may not be easily reassembled.

In this example, the code sections are shuffled. However, as described above, some embodiments may simply remove the control flow addressing and store the addressing in a PE location (e.g., an associated software article). In such cases, the control flow (or a portion thereof) may be missing rather than incorrect (i.e., shuffled).

Next, the process may determine (at 450) whether to move instructions to protected memory. Such a determination may be made based on various relevant factors (e.g., user selection, whether a flag has been set, etc.).

If the process determines (at 450) that instructions should be moved, the process may move (at 460) the set of instructions to protected space.

After moving (at 460) the instructions or after determining (at 450) that no instructions should be removed, the process may store (at 470) the protected binary and then may end.

One of ordinary skill in the art will recognize that process 400 may be implemented in various different ways without departing from the scope of the disclosure. For instance, the listed operations may be performed in different orders. Furthermore, additional operations may be included and/or listed operations may be omitted. In addition, the process may be divided into multiple sub-processes and/or combined into a larger macro process. Various operations and/or sets of operations may be performed iteratively, and/or may be performed based on satisfaction of some criteria.

Figure 5:
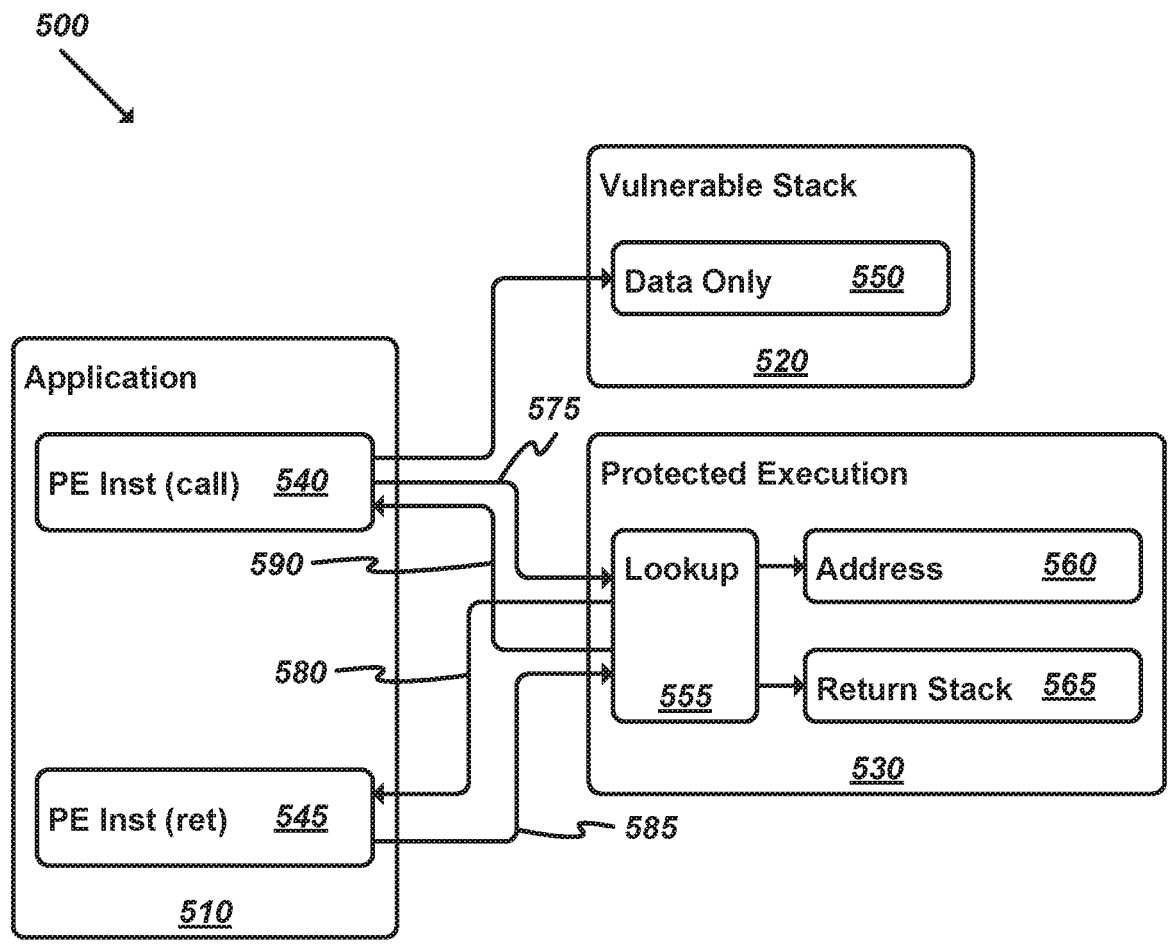
FIG. 5 illustrates a schematic block diagram of an example implementation that uses protected execution instructions to hide function call and return functions and perform protected execution of control flow and addressing.

FIG. 5 illustrates a schematic block diagram of an example implementation 500 that uses protected execution instructions 540-545 to hide function call and return functions and perform protected execution of control flow and addressing. Such an approach may provide protection against ROP attacks.

The system 500 may remove function call and ret instructions from a software article 510 and replace the functions with PE instructions 540 and 545. Return addresses are no longer maintained on the program stack 520 such that it becomes a data only stack 550 that does not include return addresses. In place of a function call instruction, a PE instruction 540 is invoked 575 and switches to protected execution 530 where a lookup process 555 locates an entry associated with the current instruction pointer in a lookup table 560.

Process 600, as described below, then may determine whether the invocation is valid, push the return address (ip) to a secure return stack 565, and branch 580 execution to the intended function 545. On completion in place of a ret instruction, the function may execute another PE instruction 545 which again may switch 585 to protected execution 530 and may execute the lookup process 555. Upon finding a valid entry in the table 560, the return address may be popped from the secure return stack 565 and execution may be returned 590 to the next instruction following the original call 540.

Figure 6:
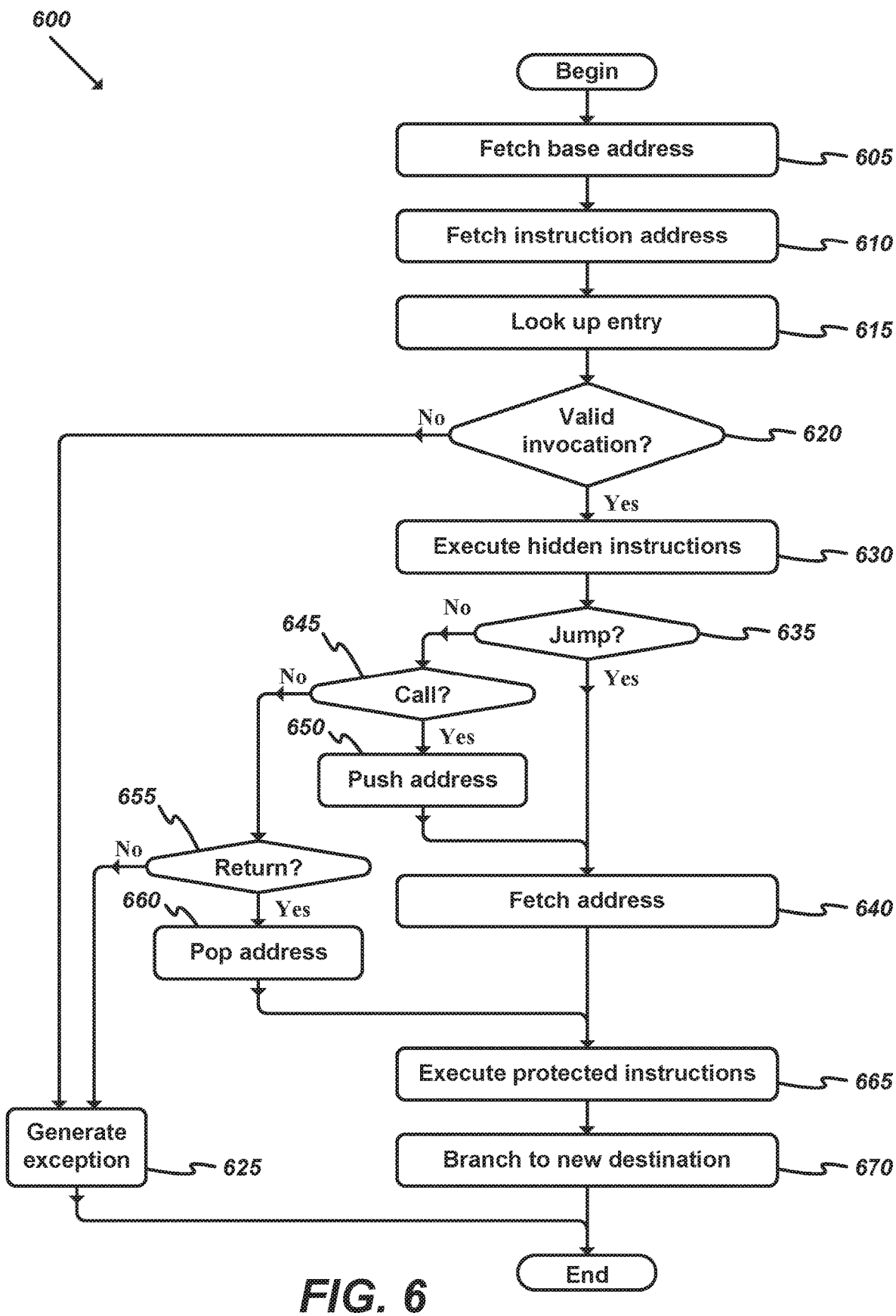
FIG. 6 illustrates a flow chart of an exemplary process that manages control flow instructions to provide protected execution.

FIG. 6 illustrates a flow chart of an exemplary process 600 that manages control flow instructions to provide protected execution using a lookup table and protected return stack. Process 600 may administer data and instructions secured by protected execution of some embodiments. The process may begin when a protected execution instruction, PE inst(n) (e.g., a system call) may be invoked to switch from normal execution to out-of-band protected execution.

As shown, the process may fetch (at 605) the base address, b, of the secure data for a software article under execution from the execution context of the program. For example, from the process table data structure of the operating system. Next, the process may fetch (at 610) the program counter instruction address, ip. For example, in a system call this information may be retrieved from the program stack.

The process may then look up (at 615) a table entry. The entry address may be calculated as n+b and the table entry data may be retrieved.

The process may then determine (at 620) whether the invocation is valid. Such a determination may be made by comparing the program counter ip with the ip entry of the table.

If the process determines (at 620) that the invocation is invalid (i.e., if there is a mismatch), the process may generate (at 625) an exception and then may end.

If the process determines (at 620) that the invocation is valid, the process may execute (at 630) any optional instructions hidden for this entry using the execution context of the process.

Next, process 600 may determine (at 635) whether the PE invocation is associated with a jump (or jmp) command from the original software article. If the process determines (at 635) that the PE invocation is associated with a jump command, the process may fetch (at 640) the destination address (an offset from ip) associated with the command from the table, or calculate the address, a, (and in the syscall example replace the return address on the stack).

If the process determines (at 635) that the invocation is not a jump, the process may then determine (at 645) whether the invocation is associated with a call (or call) command. If the process determines (at 645) that the PE invocation is associated with a call command, the process may push (at 650) the return ip address to the protected return stack and then fetch (at 640) the destination address in a similar manner as with a jump instruction.

If the process determines (at 645) that the invocation is not a call, the process may determine (at 655) whether the invocation is associated with a return (or ret) command. If the process determines (at 655) that the invocation is not associated with a return command, the process may generate (at 625) an exception and then may end.

If the process determines (at 655) that the invocation is associated with a return command, the process may pop (at 660) the return address, a, from the protected return stack.

After fetching (at 640) the address or popping (at 660) the address, the process may execute (at 665) any optional instructions associated with the entry. The process may then branch (at 670) to the new destination address a. In the system call example the return ip address may be replaced on the stack with a and the normal system call process may be allowed to execute an iret instruction returning from the system call to the new destination address as determined by the protected execution and secure control flow data.

One of ordinary skill in the art will recognize that process 600 may be implemented in various different ways without departing from the scope of the disclosure. For instance, the listed operations may be performed in different orders. Furthermore, additional operations may be included and/or listed operations may be omitted. In addition, the process may be divided into multiple sub-processes and/or combined into a larger macro process. Various operations and/or sets of operations may be performed iteratively, and/or may be performed based on satisfaction of some criteria.

Figure 7:
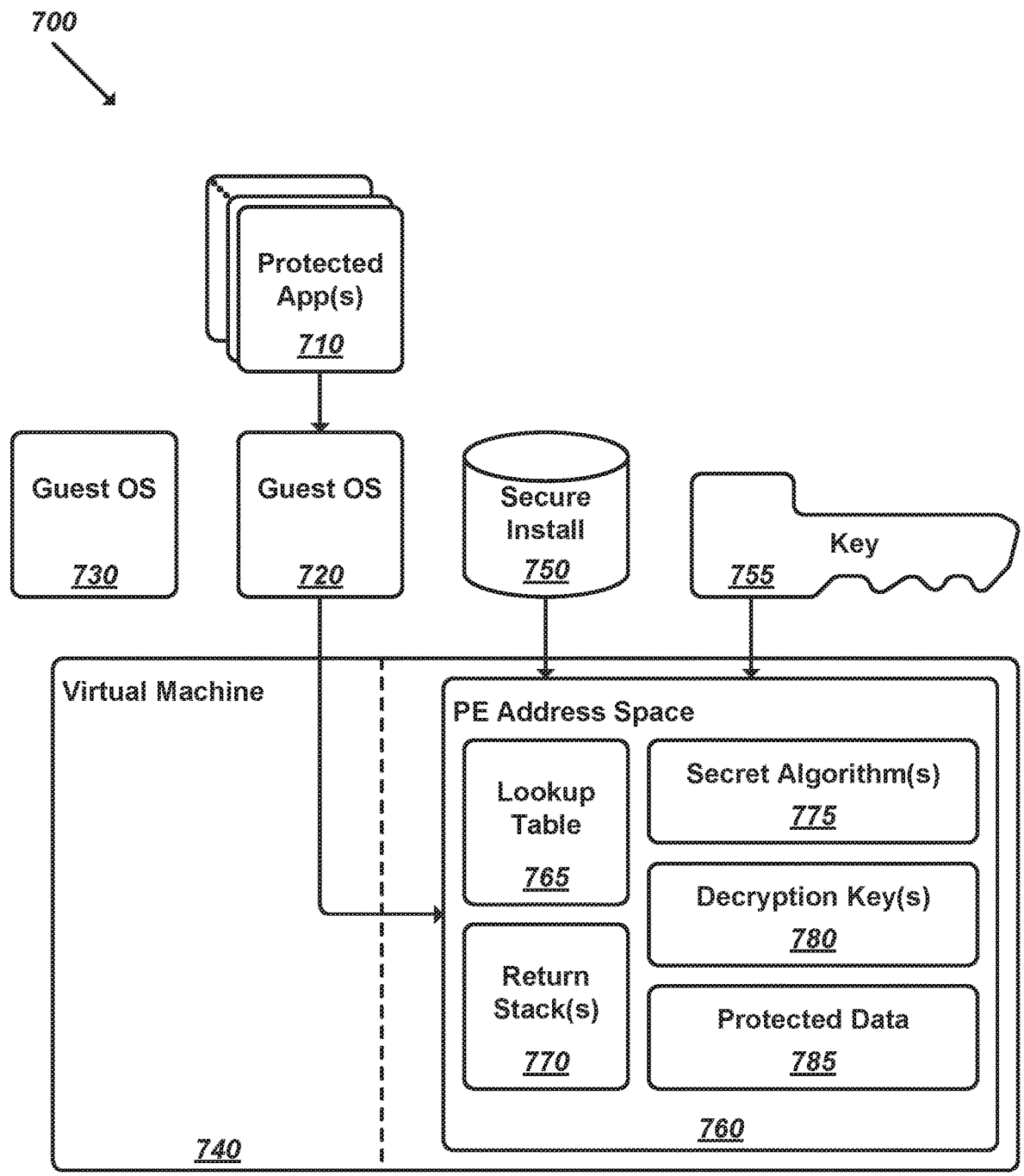
FIG. 7 illustrates a schematic block diagram of an example implementation of control flow address protection and code hiding with protected execution that utilizes hardware virtualization.

FIG. 7 illustrates a schematic block diagram of an example implementation 700 of control flow address protection and code hiding with protected execution that utilizes hardware virtualization. In this example, protected execution is implemented in a virtual machine enabled system 700 where multiple independent guest operating systems 720-730 may be running. Such protection may secure an application from tampering, exfiltration, control hijacking, and reverse engineering from an attacker that has gained residency on the system from another account or guest OS, also known as a lateral attack.

The secure data may be loaded on the system using a secure load process 750 to the protected execution address space 760 which may be allocated and managed out-of-band to the guest OSes 720-730 at system boot time. The protected software article(s) 710 may then be securely executed on the system 700 and invoke calls to protected execution 760 through one or more special PE instructions (e.g., a system call).

The instructions may be handled by the guest OS 720 which makes the switch to out-of-band protected execution 760 using the virtual machine 740, or other hardware resources to access memory that is out-of-band to the guest OS 720, and other guest OSes 730. The out-of-band protected execution memory 760 may include the secure data of the protected software article 710 such as an address lookup table 765 for jump and call instructions, a protected return stack 770 for call and return instructions, additional secret algorithms and data 775, encryption and decryption keys 780, and/or other high value data and instructions 785.

Optionally, a hardware key 755 may be employed to enable protected execution 760 which would otherwise be normally disabled, or to initially deliver the enabling secured data and instructions, or feature(s) such as a decryption key. This is useful for systems that are to operate only under controlled authority such as the enabling or arming of missiles. In such a scenario the system 700 may rendered inoperable without the hardware key 755.

Figure 8:
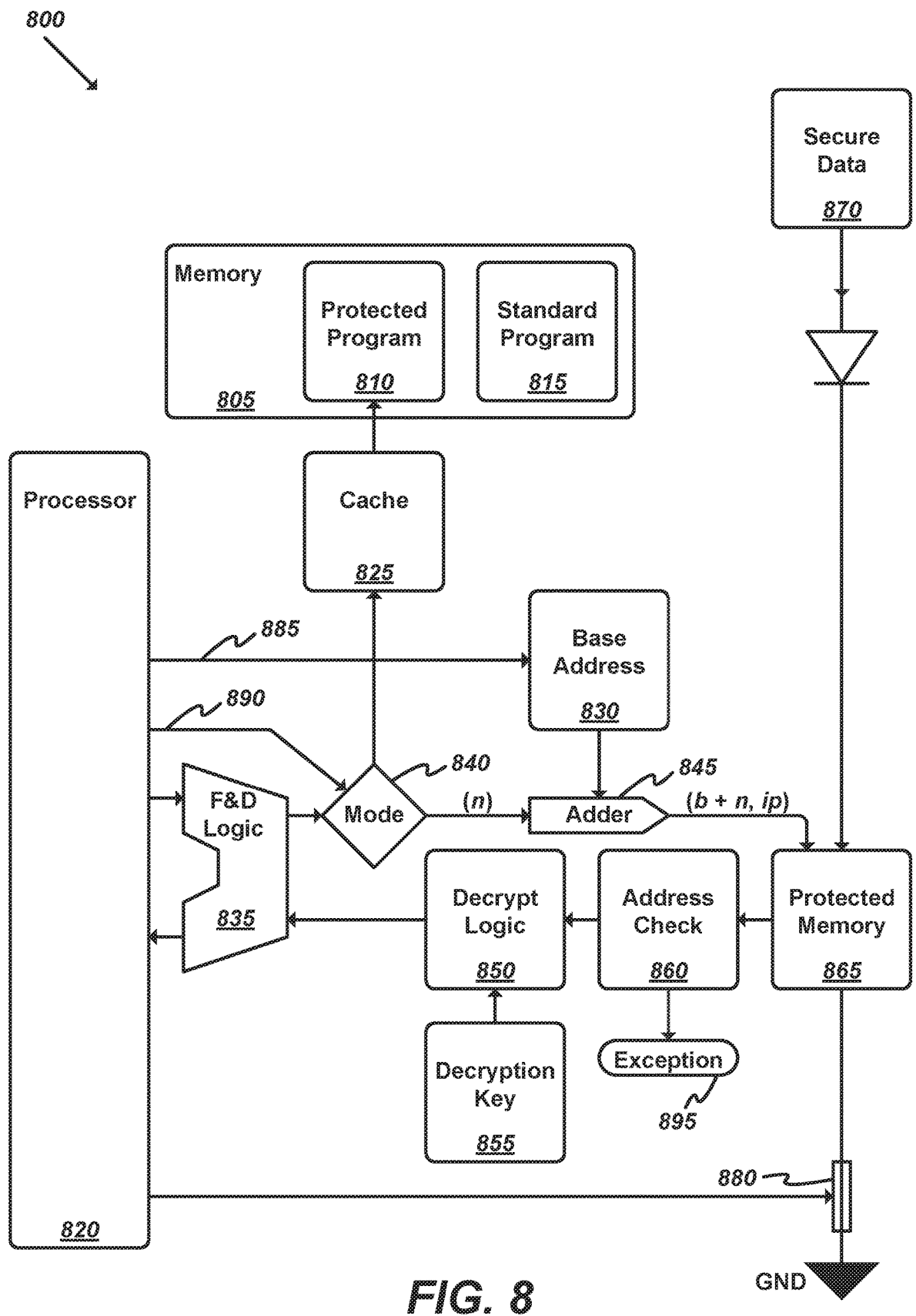
FIG. 8 illustrates a schematic block diagram of a system that utilizes hardware switching to implement protected execution.

FIG. 8 illustrates a schematic block diagram of a system 800 that utilizes hardware switching to implement protected execution. The system may use protected execution switching in hardware as part of the instruction fetch, pre-fetch and decode logic. The software protection described herein may be employed in ways other than an OS system call for OS-less embedded devices via a hardware instruction implementation that switches execution to a protected execution space, as shown in system 800.

The system 800 implements logical operations in hardware to provide an out-of-band protected execution environment to secure data and instructions associated with a software article.

A block of protected memory 865 (which may be persistent across restarts) may be implemented as write-only and loaded from cache 825. The protected program 810 may be executed from normal system memory 805 and may set the program context (typically performed by an operating system) which loads b, the base offset to a hardware register 830 using a PE instruction 885.

When the program executes the PE instruction 890, the operating mode 840 may be switched from normal instruction fetch (via cache 825) to a secure fetch (via adder 845) from the out-of-band protected memory 865. Protected memory access may be determined by adding b, the base address found in the base address register 830 to the offset n from the PE instruction 890 using the adder 845.

Once the entry address has been determined, the address of the instruction following the PE invocation (the ip register) may be verified by the address checker 860 with data stored in the protected memory 865 and an exception 895 may be raised if there is a mismatch. Such an approach prevents invocations or probing from unauthorized agents. After the check, the data and instruction(s) may be decrypted by decryption logic 850, and a CPU (or other processing unit) specific decryption key 855.

The decryption key 855 may be unique to each processing unit 820 such that the software article 810 may only execute on one system. The accompanying secure data and instructions 870 may be encrypted using a public key associated with the decryption key 855 to protect the secure data in transit. The processor-specific decryption key 855 may never need to be shared. The secure execution logic may be added to the existing instruction fetch (pre-fetch) and decode logic 835 as implemented for a processing unit 820.

A PE destroy instruction may optionally be included to enable a system to erase the data and instructions in protected memory 865 using a software fuse 880 in the event that tampering or other system compromise is detected to prevent direct bare metal attacks on the protected memory 865 and/or decryption key 855.

In this example, the cache table 825 is shown to depict that the protected execution and secure instruction fetch may be happening at the processing unit logic level or at cache level. Other unprotected programs 815 may run normally on the system 800.

The PE instructions may be defined as unprivileged instructions so that the instructions may be executed from normal operating privilege levels to perform a switch to protected execution. However, the PE destroy instruction may require privileged execution, or otherwise be implemented such that the destroy instruction may only be executed from protected execution. Otherwise, such a feature may provide a disk operating system (DOS) exploit.

Figure 9:
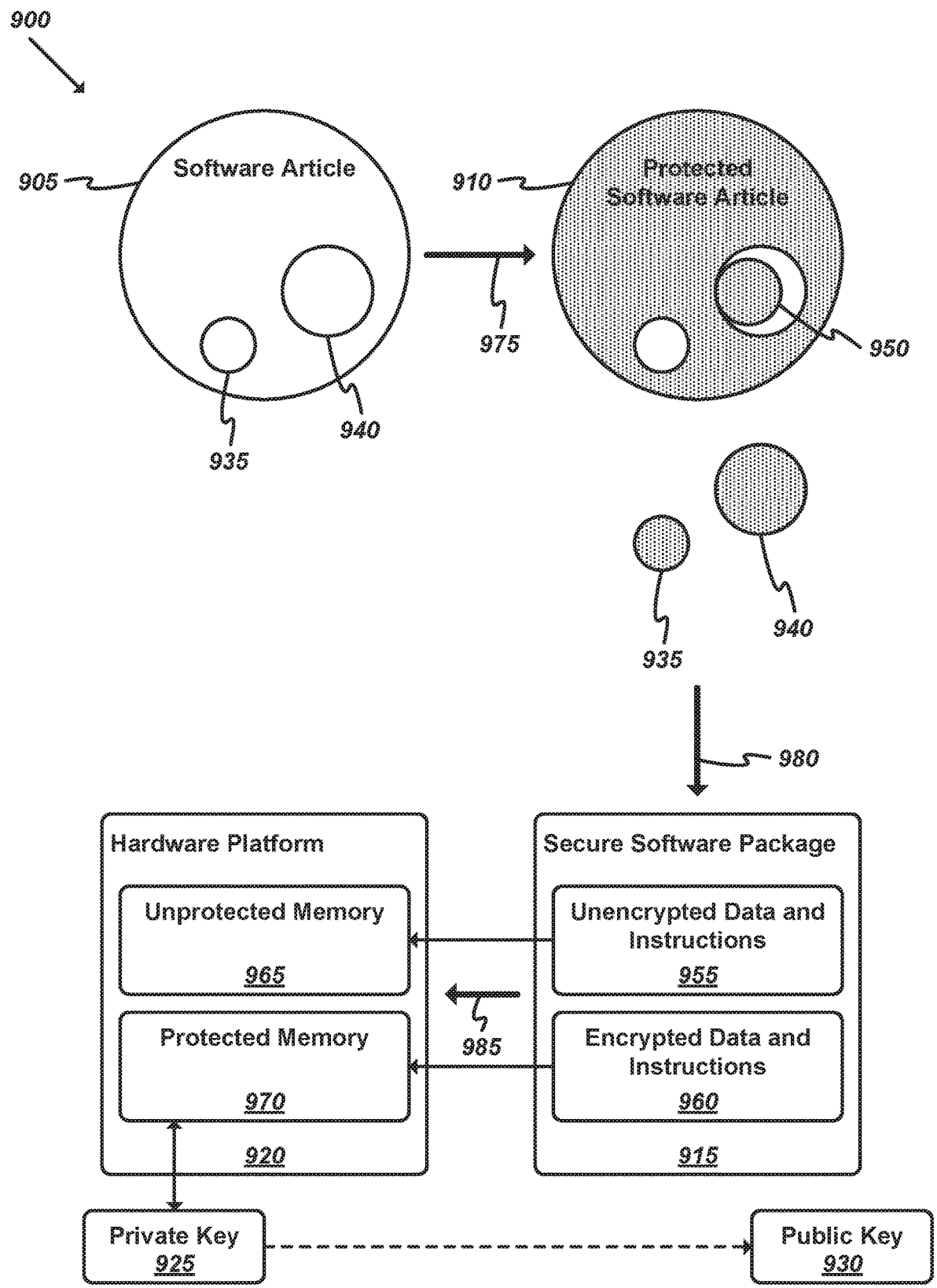
FIG. 9 illustrates a schematic block diagram of a system that utilizes public key encryption and includes a software article before and after transformation to a protected execution state.

FIG. 9 illustrates a schematic block diagram of a system 900 that utilizes public key encryption and includes a software article before 905 and after 910 transformation to a protected execution state. To further protect the secure data of control flow addressing and hidden instructions, an in-hardware CPU decryption key and hardware decryption logic may be employed.

A software article 905 may be transformed 975 into a protected software article 910, control flow data 940, an optional set of instructions 935, and inserted PE instructions 950. These articles may then be packaged by a process 980 that includes a public encryption key 930 such as that generated for PGP encryption.

The protected software article 910 along with the inserted PE instructions 950 may be added as unencrypted data and instructions 955 to the secure software package 915. The control flow data 940 and optional instructions 935 may be encrypted using the public key 930 and added as encrypted data and instructions 960 to the secure software package 915. The secure software package may then be loaded on the target system 920 using a process 985 which may copy the unencrypted data and instructions 955 to unprotected memory or disk 965 and load the encrypted data 960 to the out-of-band protected memory 970.

Instructions executed from protected execution may first pass through a hardware decryption block using a CPU specific decryption key 925. Thus, the control flow address and protected instruction article 970 may be protected in transit 985 through encryption using a public key 930, and encrypted for a specific CPU and hardware installation 920.

The decryption key 925 may be fixed in hardware and once set may only be readable by the decode logic hardware block. Theft of the article in transit results in a non-operable encrypted blob 960 that is unable to function on hardware other than that for which it was originally encoded using the public key 930. A direct bare wire dump of the memory also produces a non-operable encrypted blob and hardware may further be secured by anti-tamper triggers that detect such activity and fuse the memory when such activity is detected.

Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.).

Such circuitry may be able to perform functions and/or features that may be associated with various software elements described throughout.

Figure 10:
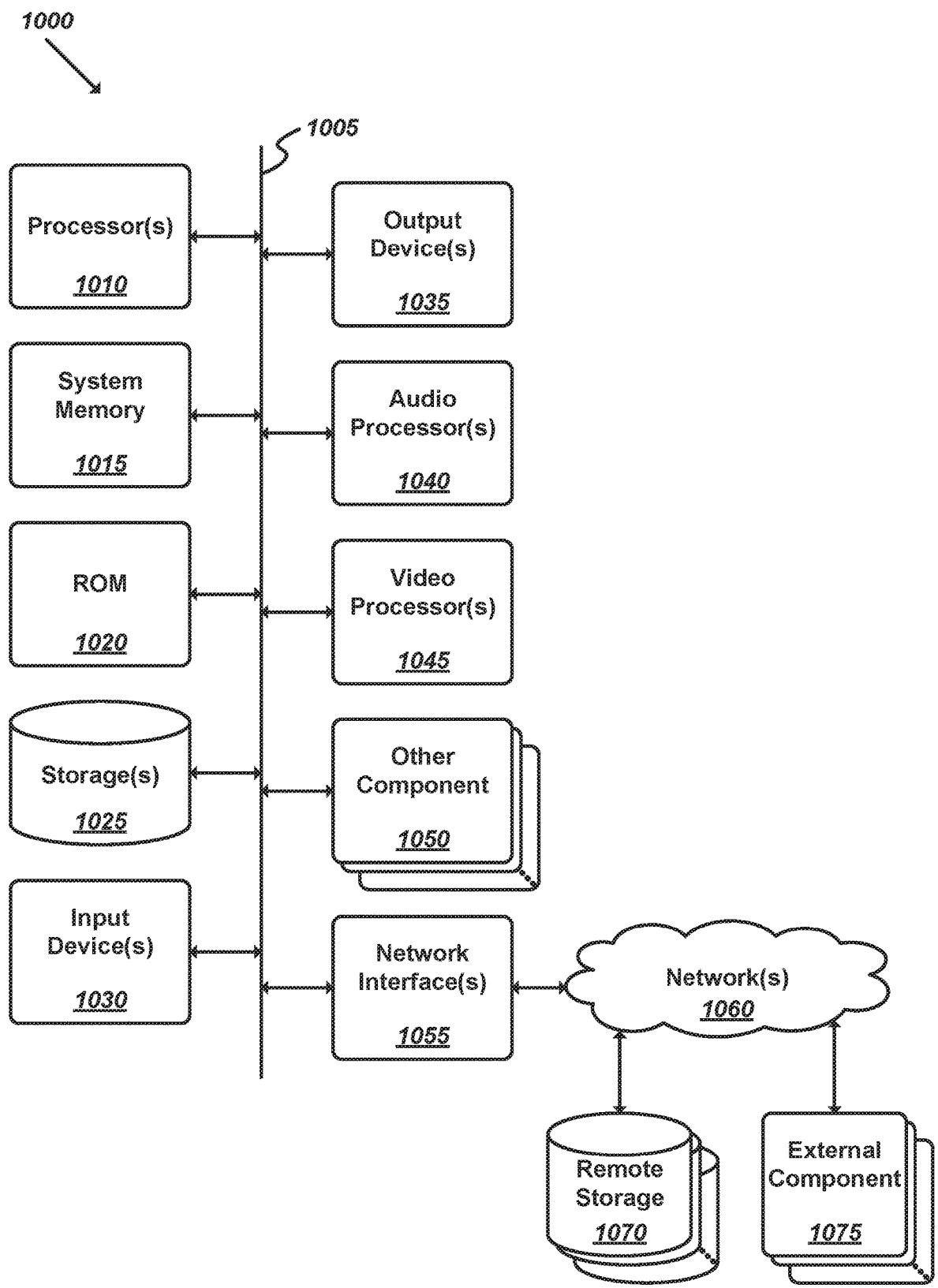
FIG. 10 illustrates a schematic block diagram of an exemplary computer system used to implement some embodiments.

FIG. 10 illustrates a schematic block diagram of an exemplary computer system 1000 used to implement some embodiments. For example, the system described above in reference to FIG. 1, FIG. 2, FIG. 5, FIG. 6, and FIG. 9 may be at least partially implemented using computer system 1000. As another example, the processes described in reference to FIG. 6 may be at least partially implemented using sets of instructions that are executed using computer system 1000.

Computer system 1000 may be implemented using various appropriate devices. For instance, the computer system may be implemented using one or more personal computers (PCs), servers, mobile devices (e.g., a smartphone), tablet devices, cloud infrastructure, virtual machines, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1000 may include at least one communication bus 1005, one or more processors 1010, a system memory 1015, a read-only memory (ROM) 1020, permanent storage devices 1025, input devices 1030, output devices 1035, audio processors 1040, video processors 1045, various other components 1050, and one or more network interfaces 1055.

Bus 1005 represents all communication pathways among the elements of computer system 1000. Such pathways may include wired, wireless, optical, and/or other appropriate communication pathways. For example, input devices 1030 and/or output devices 1035 may be coupled to the system 1000 using a wireless connection protocol or system.

The processor 1010 may, in order to execute the processes of some embodiments, retrieve instructions to execute and/or data to process from components such as system memory 1015, ROM 1020, and permanent storage device 1025. Such instructions and data may be passed over bus 1005.

System memory 1015 may be a volatile read-and-write memory, such as a random access memory (RAM). The system memory may store some of the instructions and data that the processor uses at runtime. The sets of instructions and/or data used to implement some embodiments may be stored in the system memory 1015, the permanent storage device 1025, and/or the read-only memory 1020. ROM 1020 may store static data and instructions that may be used by processor 1010 and/or other elements of the computer system.

Permanent storage device 1025 may be a read-and-write memory device. The permanent storage device may be a non-volatile memory unit that stores instructions and data even when computer system 1000 is off or unpowered. Computer system 1000 may use a removable storage device and/or a remote storage device as the permanent storage device.

Input devices 1030 may enable a user to communicate information to the computer system and/or manipulate various operations of the system. The input devices may include keyboards, cursor control devices, audio input devices and/or video input devices. Output devices 1035 may include printers, displays, audio devices, etc. Some or all of the input and/or output devices may be wirelessly or optically connected to the computer system 1000.

Audio processor 1040 may process and/or generate audio data and/or instructions. The audio processor may be able to receive audio data from an input device 1030 such as a microphone. The audio processor 1040 may be able to provide audio data to output devices 1040 such as a set of speakers. The audio data may include digital information and/or analog signals. The audio processor 1040 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 1045 (or graphics processing unit) may process and/or generate video data and/or instructions. The video processor may be able to receive video data from an input device 1030 such as a camera. The video processor 1045 may be able to provide video data to an output device 1040 such as a display. The video data may include digital information and/or analog signals. The video processor 1045 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 1050 may perform various other functions including providing storage, interfacing with external systems or components, etc.

Finally, as shown in FIG. 10, computer system 1000 may include one or more network interfaces 1055 that are able to connect to one or more networks 1060. For example, computer system 1000 may be coupled to a web server on the Internet such that a web browser executing on computer system 1000 may interact with the web server as a user interacts with an interface that operates in the web browser. Computer system 1000 may be able to access one or more remote storages 1070 and one or more external components 1075 through the network interface 1055 and network 1060. The network interface(s) 1055 may include one or more application programming interfaces (APIs) that may allow the computer system 1000 to access remote systems and/or storages and also may allow remote systems and/or storages to access computer system 1000 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1000 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

We claim:

1. A method of software article protection and transformation, the method comprising:
 retrieving a software article;
 identifying control flow addressing associated with the software article;
 removing at least a portion of the control flow addressing from the software article, wherein removing the at least a portion of the control flow addressing from the software article comprises replacing call and return functions with protected execution instructions, wherein the protected execution instructions replace call functions by:
  identifying, in a lookup table, an entry associated with a current instruction pointer; and
  pushing a return address associated with the current instruction pointer to a secure return stack; and
 wherein the protected execution instructions replace return functions by:
  popping the return address from the secure return stack;
  encrypting the at least a portion of the control flow addressing using a public key; and
  saving the at least a portion of the encrypted control flow addressing to a separate software article that is associated with the software article.

2. The method of claim 1 further comprising removing a set of instructions included in the software article and saving the set of instructions to the separate software article.

3. The method of claim 1 further comprising:
 dividing the software article into sections;
 reordering the sections; and
 defining linking protected execution instructions that link the sections together.

4. The method of claim 1 further comprising generating a set of protected execution instructions that switch to out-of-band protected execution.

5. The method of claim 4, wherein the set of protected execution instructions includes at least one of a control flow branch instruction, a control flow address, and an executable instruction.

6. The method of claim 1, wherein the software article is one of a program binary, source file, library, and executable component.

7. The method of claim 1, wherein the software article comprises non-executable content including at least one of text, image, and audio data.

8. The method of claim 1, wherein the replaced return functions from the software article are stored in a protected stack.

9. The method of claim 8 further comprising generating a destination address based on a return address associated with a call function, a specified offset, and a base address.

10. The method of claim 9, wherein the destination address is generated based on a hardware-specific encryption key that is different than the public key.

11. A non-transitory computer-readable storage medium that stores a protected software article generated by:
 retrieving a software article;
 identifying control flow instructions associated with the software article;
 removing at least one control flow instruction from the software article, wherein removing at least one control flow instruction from the software article comprises replacing call and return functions with protected execution instructions, wherein the protected execution instructions replace call functions by:
  identifying, in a lookup table, an entry associated with a current instruction pointer; and
  pushing a return address associated with the current instruction pointer to a secure return stack; and
 wherein the protected execution instructions replace return functions by:
  popping the return address from the secure return stack;
  encrypting the at least one control flow instruction using a public key;
  adding remaining instructions to the protected software article;
  adding the at least one control flow instruction to a protected execution file; and
  storing the protected software article and the protected execution file.

12. The non-transitory computer-readable storage medium of claim 11, wherein the protected software article is further generated by removing at least one other instruction that is not a control flow instruction.

13. The non-transitory computer-readable storage medium of claim 11, wherein the protected software article is further generated by:
 dividing the software article into a plurality of sections;
 reordering the sections into a modified order that is different from an original order of the sections; and
 defining a set of linking protected execution instructions that link the sections together in the original order.

14. The non-transitory computer-readable storage medium of claim 13, wherein the protected software article is further generated by adding at least one decoy instruction to the protected software article.

15. A device, comprising:
 one or more processors configured to:
  retrieve a software article;
  identify control flow addressing associated with the software article;
  remove at least a portion of the control flow addressing from the software article, wherein removing the at least a portion of the control flow addressing from the software article comprises replacing call and return functions with protected execution instructions, wherein the protected execution instructions replace call functions by:
   identifying, in a lookup table, an entry associated with a current instruction pointer; and
   pushing a return address associated with the current instruction pointer to a secure return stack; and
  wherein the protected execution instructions replace return functions by:
   popping the return address from the secure return stack;
  encrypt the at least a portion of the control flow addressing using a public key; and
  save the at least a portion of the encrypted control flow addressing to a separate software article that is associated with the software article.

16. The device of claim 15, the one or more processors further configured to remove a set of instructions included in the software article and saving the set of instructions to the separate software article.

17. The device of claim 15, the one or more processors further configured to:
 divide the software article into sections;
 reorder the sections; and define linking protected execution instructions that link the sections together.

18. The device of claim 15, the one or more processors further configured to generate a set of protected execution instructions that switch to out-of-band protected execution, wherein the set of protected execution instructions includes at least one of a control flow branch instruction, a control flow address, and an executable instruction.

* * * * *